(12) United States Patent
Henson

(10) Patent No.: US 7,725,759 B2
(45) Date of Patent: May 25, 2010

(54) SYSTEM AND METHOD OF MANAGING CLOCK SPEED IN AN ELECTRONIC DEVICE

(75) Inventor: Matthew Henson, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 295 days.

(21) Appl. No.: 11/170,475

(22) Filed: Jun. 29, 2005

(65) Prior Publication Data

US 2007/0006006 A1    Jan. 4, 2007

(51) Int. Cl.
G06F 1/08    (2006.01)
G06F 13/366  (2006.01)

(52) U.S. Cl. ............... 713/600; 713/300; 713/322; 713/400; 713/401; 713/500; 713/501; 713/502; 713/503; 713/601; 710/15; 710/309

(58) Field of Classification Search ......... 713/300, 713/322, 500–503, 400–401, 600–601; 710/15, 710/309
See application file for complete search history.

(56) References Cited

U.S. PATENT DOCUMENTS

| | | | |
|---|---|---|---|
| 5,167,024 A * | 11/1992 | Smith et al. ............ | 713/322 |
| 5,440,747 A | 8/1995 | Kiuchi | |
| 5,491,814 A | 2/1996 | Yee et al. | |
| 5,680,554 A * | 10/1997 | Baek .................. | 710/107 |
| 5,684,997 A | 11/1997 | Kau et al. | |
| 5,710,911 A | 1/1998 | Walsh et al. | |
| 5,721,933 A | 2/1998 | Walsh et al. | |
| 5,727,221 A | 3/1998 | Walsh et al. | |
| 5,729,720 A | 3/1998 | Kau et al. | |
| 5,734,919 A | 3/1998 | Walsh et al. | |
| 5,754,436 A | 5/1998 | Walsh et al. | |
| 5,754,837 A | 5/1998 | Walsh et al. | |
| 5,771,373 A | 6/1998 | Kau et al. | |
| 5,781,780 A | 7/1998 | Walsh et al. | |
| 5,784,291 A | 7/1998 | Chen et al. | |
| 5,822,550 A | 10/1998 | Milhaupt et al. | |
| 5,835,733 A | 11/1998 | Walsh et al. | |
| 5,842,005 A | 11/1998 | Walsh et al. | |
| 5,845,132 A | 12/1998 | Walsh et al. | |
| 5,848,253 A | 12/1998 | Walsh et al. | |

(Continued)

FOREIGN PATENT DOCUMENTS

EP    0453199 A2    4/1991

(Continued)

OTHER PUBLICATIONS

Mobile Intel Pentium III Processor Family; (URL, not available); 2 pages.

(Continued)

*Primary Examiner*—Thomas Lee
*Assistant Examiner*—Fahmida Rahman
(74) *Attorney, Agent, or Firm*—Toler Law Group

(57) ABSTRACT

A method of controlling a clock frequency is disclosed and includes monitoring a plurality of master devices that are coupled to a bus within a system. The method also includes receiving an input from at least one of the plurality of master devices. The input can be a request an increase to the clock frequency of the bus. Further, the method includes selectively increasing the clock frequency of the bus in response to the request.

27 Claims, 6 Drawing Sheets

U.S. PATENT DOCUMENTS

| | | | |
|---|---|---|---|
| 5,852,370 | A | 12/1998 | Ko |
| 5,864,702 | A | 1/1999 | Walsh et al. |
| 5,867,717 | A | 2/1999 | Milhaupt et al. |
| 5,870,617 | A | 2/1999 | Walsh et al. |
| 5,870,621 | A | 2/1999 | Walsh et al. |
| 5,872,893 | A | 2/1999 | Takenaka et al. |
| 5,875,312 | A | 2/1999 | Walsh et al. |
| 5,898,879 | A | 4/1999 | Kim |
| 5,943,507 | A | 8/1999 | Cornish et al. |
| 5,987,244 | A | 11/1999 | Kau et al. |
| 6,055,619 | A | 4/2000 | North et al. |
| 6,112,273 | A | 8/2000 | Kau et al. |
| 6,163,848 | A * | 12/2000 | Gephardt et al. ............ 713/322 |
| 6,374,319 | B1 | 4/2002 | Singh |
| 6,421,754 | B1 | 7/2002 | Kau et al. |
| 6,470,289 | B1 | 10/2002 | Peters et al. |
| 6,483,342 | B2 * | 11/2002 | Britton et al. ................ 326/39 |
| 6,643,792 | B1 * | 11/2003 | Kurosawa ................... 713/501 |
| 6,735,653 | B2 * | 5/2004 | O Mathuna et al. ......... 710/105 |
| 6,785,829 | B1 * | 8/2004 | George et al. .............. 713/320 |
| 6,813,719 | B2 * | 11/2004 | Athas ........................ 713/320 |
| 7,007,121 | B1 * | 2/2006 | Ansari et al. ................ 710/113 |
| 7,093,152 | B2 * | 8/2006 | Shikata et al. .............. 713/501 |
| 7,155,631 | B2 * | 12/2006 | Kiriake ....................... 713/600 |
| 2002/0007431 | A1 | 1/2002 | Date et al. |
| 2002/0059491 | A1 | 5/2002 | Date et al. |
| 2002/0116562 | A1 | 8/2002 | Mathuna et al. |
| 2003/0043842 | A1 | 3/2003 | Tran et al. |
| 2003/0056154 | A1 | 3/2003 | Edwards et al. |
| 2003/0103508 | A1 | 6/2003 | Landaveri et al. |
| 2003/0147384 | A1 | 8/2003 | Landaveri et al. |
| 2003/0159080 | A1 | 8/2003 | Kiriake |
| 2003/0169699 | A1 | 9/2003 | Haardt |
| 2004/0043800 | A1 | 3/2004 | Hosoi |
| 2004/0117743 | A1 | 6/2004 | Gehman et al. |
| 2004/0195572 | A1 | 10/2004 | Kato et al. |
| 2004/0267504 | A1 | 12/2004 | Jaber et al. |
| 2005/0055592 | A1 * | 3/2005 | Velasco et al. .............. 713/322 |
| 2005/0132352 | A1 * | 6/2005 | Shen .......................... 717/174 |
| 2005/0289268 | A1 * | 12/2005 | Miller ........................ 710/110 |
| 2005/1028926 | | 12/2005 | Miller |
| 2006/0026330 | A1 * | 2/2006 | Yi et al. ...................... 710/309 |
| 2007/0208964 | A1 * | 9/2007 | Sandon et al. .............. 713/501 |

FOREIGN PATENT DOCUMENTS

| | | |
|---|---|---|
| EP | 0 453 199 A2 | 10/1991 |
| JP | 2003345455 A | 12/2003 |
| WO | 02/27451 A2 | 4/2002 |
| WO | WO 02/27451 A2 | 4/2002 |

OTHER PUBLICATIONS

English Language Translation of JP 61-260345 (Abstract only).
English Language Translation of JP 2004-062362 (Abstract only).
English Language Translation of JP 2002-175270 (Abstract only).
English Language Translation of JP 09-128296 (Abstract only).
English Language Translation of JP 64-025266 (Abstract only).
International Search Report and Written Opinion of the International Searching Authority for International Application No. PCT/US/43570, mailed on Jul. 20, 2007; 8 pages.
Great Britain Search Report mailed on May 19, 2006; 2 pages.
Great Britain Search Report mailed on Sep. 19, 2006; 2 pages.

* cited by examiner

SYSTEM AND METHOD OF MANAGING CLOCK SPEED IN AN ELECTRONIC DEVICE

FIELD OF THE DISCLOSURE

The present disclosure relates to electronic devices and to managing clock speeds within electronic devices.

BACKGROUND

As technology advances, portable multimedia devices are being designed with increased functionality and increased efficiency to support that functionality. For example as storage within portable audio players, such as an MPEG-1 Audio Layer-3 (MP3) player, increases, the need to quickly and efficiently access stored audio files also increases. One way to increase the performance of the MP3 player and provide quicker access to stored files is to increase the clock frequency of the clock used in the device. However, as the clock frequency increases to deliver more performance, the power consumption of the MP3 player also increases.

Accordingly, there is a need for an improved system and method of controlling a clock frequency in an electronic device in order to selectively deliver faster clock speeds.

DETAILED DESCRIPTION OF DRAWINGS

Figure 1:
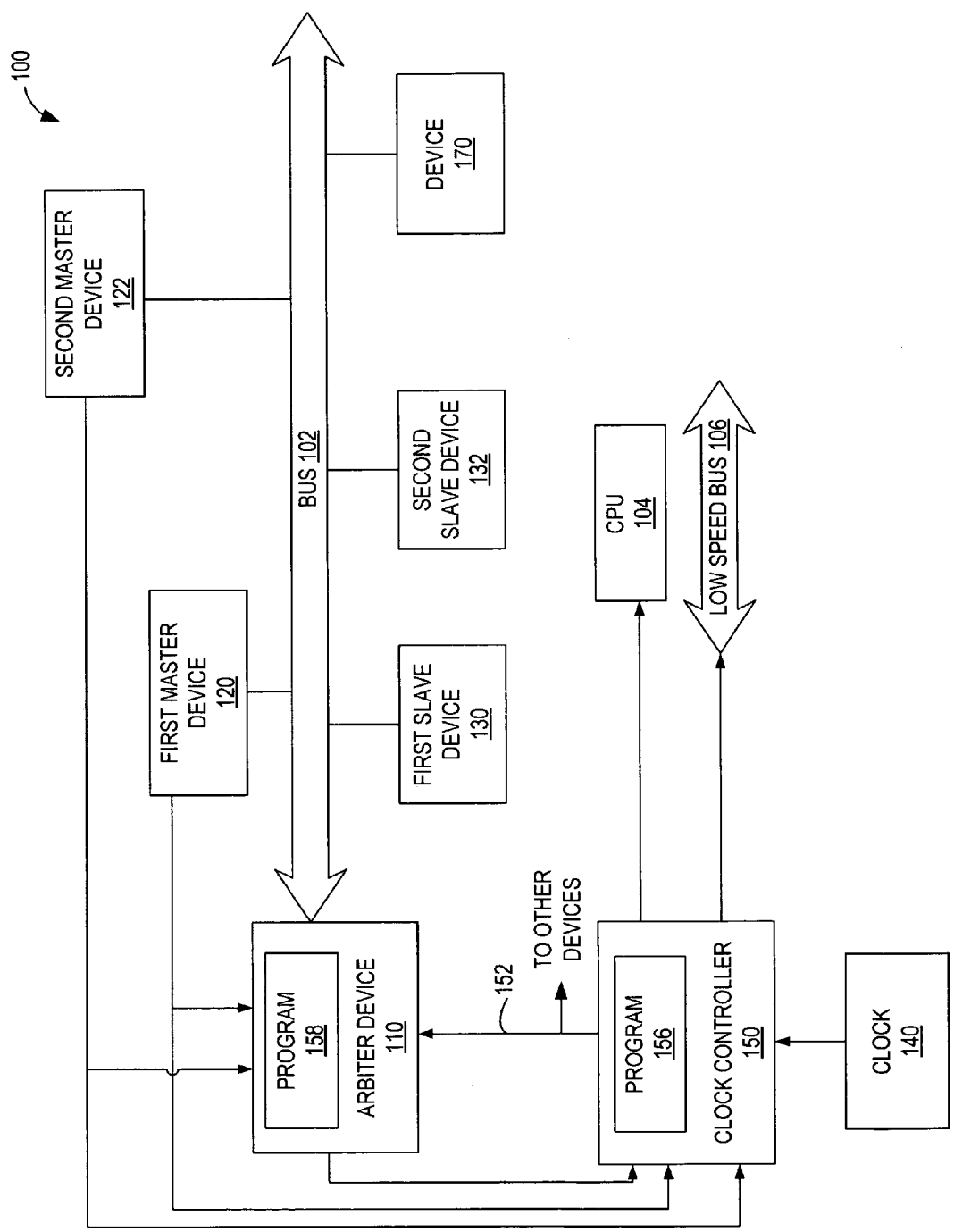
FIG. 1 is a block diagram that illustrates an electronic system.

A method of controlling a clock frequency is disclosed and includes monitoring a plurality of master devices that are coupled to a bus within a system. The method also includes receiving an input from at least one of the plurality of master devices. The input can be a request for an increase to the clock frequency of the bus. Further, the method includes selectively increasing the clock frequency of the bus in response to the request.

In a particular embodiment, the method includes determining whether to enable the request to increase the clock frequency of the bus and setting a high frequency flag. In another particular embodiment, the method includes clearing the high frequency flag. Additionally, in yet another particular embodiment, the method includes monitoring a plurality of high frequency flags and increasing a clock frequency when at least one of the plurality of high frequency flags are set. In another particular embodiment, the method includes decreasing the clock frequency to a slow mode when none of the plurality of high frequency flags are set.

In still another particular embodiment, the method includes determining whether the at least one of the plurality of master devices is a preferred device prior to setting a high frequency flag. The preferred device can be a processor, an input/output bus controller, a direct memory access (DMA) controller, an error correction code module, and an external memory interface.

In another particular embodiment, the method includes determining a number of master devices requesting bus access, determining whether the number of master devices requesting bus access is greater than a threshold, and setting a high frequency flag for master activity level, when the number is greater than the threshold. In yet another particular embodiment, the method includes clearing a previously set high frequency flag for master activity level, when the number of master devices requesting bus access is less than the threshold.

In another embodiment, a method of controlling a clock frequency of a bus coupled to a plurality of devices is disclosed and includes monitoring a plurality of devices that are coupled to the bus and receiving a bus master request from at least one of the plurality of devices. The bus master request can be a request to communicate via the bus. In this particular embodiment, the method also includes determining whether the at least one of the plurality of devices is a preferred device and setting a high frequency flag for the at least one of the plurality of devices when the at least one of the plurality of devices is a preferred device.

In yet another embodiment, a method of controlling a clock frequency of a bus coupled to a plurality of devices is disclosed and includes monitoring a plurality of devices that are coupled to the bus, determining a number of master devices that are requesting bus access, determining whether the number of master devices that are requesting bus access is greater than a threshold, and setting a high frequency flag for master activity level when the number is greater than the threshold.

In still another embodiment, a system is disclosed and includes a bus, at least one master device that is coupled to the bus, at least one slave device that is coupled to the bus, and a clock controller that is coupled to the at least one master device. The clock controller can output a variable clock frequency that varies in response to one or more inputs from the at least one master device.

In yet still another embodiment, a system is disclosed and includes a bus and a first master device that is coupled to the bus. The first master device can provide a first trigger input as a request to increase a variable clock frequency. Further, the system includes a programmable clock controller that has a computer program embedded therein. In this embodiment, the computer program includes instructions to adjust the variable clock frequency in response to the first trigger input. The variable clock frequency is provided in response to the request.

The functionality of various systems, modules, circuits, devices or components described herein may be implemented as hardware (including discrete components, integrated circuits and systems-on-a-chip 'SoC'), firmware (including application specific integrated circuits and programmable chips) and/or software or a combination thereof, depending on the application requirements.

FIG. 1 depicts an electronic system, generally designated 100, that includes a plurality of devices connected by a bus 102, according to an illustrative embodiment. In a particular embodiment, the bus 102 is an advanced microprocessor bus architecture (AMBA) type of bus used for SoC interconnects. In another embodiment, the bus 102 may be based on a proprietary bus communication standard or may be based on other published standards.

An arbiter 110 is coupled to the bus 102. In addition, at least one master device that includes a first master device 120 and a second master device 122 and at least one slave device that includes a first slave device 130 and a second slave device 132 are coupled to the bus 102. Further, a clock controller 150 is coupled to the arbiter 110 and a clock 140 is coupled to the clock controller 150. In an alternative embodiment, the clock 140 can be integrated with the clock controller 150.

FIG. 1 also shows a central processing unit (CPU) 104 coupled to the clock controller 150. As further shown, the first master device 120 and the second master device 122 are each coupled to the clock controller 150 and the arbiter 110.

In a particular embodiment, the arbiter 110 controls the flow of data on the bus 102 including the bus timing. The first master device 120 may initiate communication with the first slave device 130 by requesting an access token from the arbiter 110 to communicate over the bus 102. The first slave device 130 may receive data but may not initiate communication with a master. That is, the first slave device 130 is disabled to initiate communication with the plurality of devices coupled to the bus 102. In an alternative embodiment, more than two master devices and/or more than two slave devices may be coupled to the bus 102.

In an exemplary embodiment, the first master device 120 can be a processor, an input/output bus controller, a direct memory access (DMA) controller, an error correction code module or an external memory interface. Examples of the slave device 130 may include an on-chip memory, an off-chip memory, a flash controller, a power supply controller, or any other peripheral device or controller.

In an illustrative embodiment, the clock 140 provides a clock signal to the clock controller 150. The clock signal received by the clock controller 150 can be altered within the clock controller 150. The clock controller 150 can output a high speed clock 152 having a variable clock frequency to the bus 102 via the arbiter 110 and another high speed clock output to the CPU 104. Further, the clock controller 150 can output a low speed clock output to a low speed bus 106. In an exemplary embodiment, the clock controller 150 can output the high speed clock 152 directly to the bus 102.

In an alternative embodiment, the high speed clock 152 and the low speed output can be provided to additional master or slave devices such as the device 170 based on the application requirements. In an exemplary embodiment, the clock controller 150 outputs a clock frequency that is variable or adjustable. In other words, the clock frequency of the high speed clock 152 is adjustable to meet a desired output of the device while reducing power consumed by the device. Since power consumption is proportional to the number of transitions on the logic, a decrease in the selectable clock frequency (selected during light load conditions) causes a corresponding decrease in power consumed by the devices coupled to the bus 102, such as the master devices 120, 122.

In a particular embodiment, the clock frequency of the high speed clock 152 may be varied between a minimum frequency and a maximum frequency. The specific values for the upper and lower limit of the frequency range may vary and may depend on the application. In a particular embodiment, the maximum clock frequency is 100 megahertz (MHz) and the minimum clock frequency is 1000 kilohertz (kHz). In a particular embodiment, a typical value for the variable clock frequency of the high speed clock 152 may be 100 megahertz. In one embodiment, the clock frequency is selected to be at the maximum frequency divisible by a factor of 1, 2, 4, 8 or 16.

Each of the plurality of devices coupled to the bus 102 provide a corresponding trigger output. Each of the trigger outputs may be triggered or enabled in response to an event such as a desired increase in device performance. For example, an occurrence of an increase (or decrease) in output and/or an increase (or decrease) in needed performance due to loading of the device measured within a predefined time interval may trigger the event output. An example of a load or an output of a device may include a level of audio processing or signal output of an MP3 player. As another example, an occurrence of a change in power consumed by the device may trigger the event output. In a particular embodiment, the predefined time interval may vary from one microsecond to several milliseconds. In another embodiment, the trigger output is generated when the increase (or decrease) in the device output is above a threshold. As yet another example, the arbiter 10 detects change in the flow of data on the bus 102 and generates a trigger event.

The generation of the trigger output is indicative of a request to change the clock frequency of the high speed clock 152. That is, the device provides the trigger output when a predefined change occurs in the device performance such as a variation in the load or the output of the device.

In a particular embodiment, the plurality of trigger outputs are received by the clock controller 150 as corresponding trigger signal inputs. The clock controller 150 controls and/or adjusts the high speed clock 152 by changing the clock frequency in response to the plurality of trigger signal inputs. That is, the clock frequency of the high speed clock 152 may be adjusted and provided as an output to directly control the clock frequency of other devices such as the second master device 122 and/or provided as an output to the arbiter 110 for controlling speed of the bus 102.

In an alternative embodiment, the plurality of trigger outputs are received by the arbiter 110 as corresponding trigger signal inputs respectively. The clock controller 150 controls the arbiter 110. The arbiter 110 communicates with the clock controller 150 to request changes in frequency. The arbiter 110 controls and/or adjusts a clock frequency of the bus 102 in response to receiving the plurality of trigger signal inputs. That is, the arbiter 110 adjusts an input clock to provide the adjusted clock frequency for controlling the speed of the bus 102. In a particular embodiment, the input clock is the high speed clock 152 and the high speed clock 152 may be further adjusted or passed through to the bus 102.

In a particular embodiment, the clock controller 150 processes each of the trigger signal inputs and provides the high speed clock 152 based on the particular inputs. That is, the clock controller 150 adjusts the clock frequency differently based on which ones of the trigger signal inputs have been enabled. For example, the trigger signal input from a particular or preferred master device may be viewed to have a higher priority compared to other inputs. As another example, the clock controller 150 may adjust the clock frequency when at least n inputs of the plurality of trigger signal inputs have been enabled. Preferred devices may be selected by comparing device attributes such as power consumption for a predefined clock frequency. In a particular embodiment, the preferred device may include a master device that consumes more power at a predefined frequency compared to another master device that consumes less power at the same frequency.

In a particular embodiment, the clock controller 150 may determine that a change in the high speed clock 152 may not be desired. In this embodiment, adjusting the frequency selection output may include not changing the variable clock frequency in response to the trigger inputs. For example, if the clock frequency is already at the maximum frequency then an increase in the device output may not result in a corresponding increase in the clock frequency. In a particular embodiment, the variable clock frequency is selected to be equal to the minimum clock frequency when all of the plurality of trigger outputs are disabled. Operation in this mode results in additional power savings compared to operating modes when at least some of the plurality of trigger outputs are enabled.

In a particular embodiment, the clock controller 150 may be implemented as a programmable device having an embedded computer program 156. The computer program 156 includes one or more instructions to perform various functions such as adjusting the high speed clock 152 in response to one or more of the trigger inputs. The high speed clock 152 is provided to at least one device for changing the clock frequency in response to a trigger input.

In a particular embodiment, the clock controller 150 is programmable to differentiate each of the trigger inputs. That is, the clock controller 150 adjusts the selected clock frequency differently based on which ones of the trigger inputs have been enabled. For example, the trigger input from a particular or preferred master device may be programmed to have a higher priority compared to other inputs. As another example, the clock controller 150 may be programmed to change the selected clock frequency when at least n inputs of the plurality of trigger inputs have been enabled.

As described earlier, in addition to and/or in lieu of controlling the clock frequency by the clock controller 150, the arbiter 10 may be used to control the speed of the bus 102 by adjusting the clock frequency provided to the bus 102. In a particular embodiment, the arbiter 110 may include a computer program 158 to control the clock frequency of the clock signal provided to the bus 102. That is, the computer program 158 includes one or more instructions to selectively slow down and/or speed up certain devices coupled to the bus 102. For example, the computer program 158 may selectively slow down the second master device 122 to match the throughput performance of a slave memory device being accessed by the second master device 122.

In a particular embodiment, the computer program 158 may differentiate between master devices and/or slave devices coupled to the bus 102. That is, the arbiter 110 adjusts the clock frequency of the bus 102 differently based on which ones of the master devices request communication. For example, the token request from a particular master device may be programmed to have a higher priority compared to others. As another example, the arbiter 110 may be programmed to change the clock frequency of the bus 102 when at least n master devices coupled to the bus 102 have requested communication.

Figure 2:
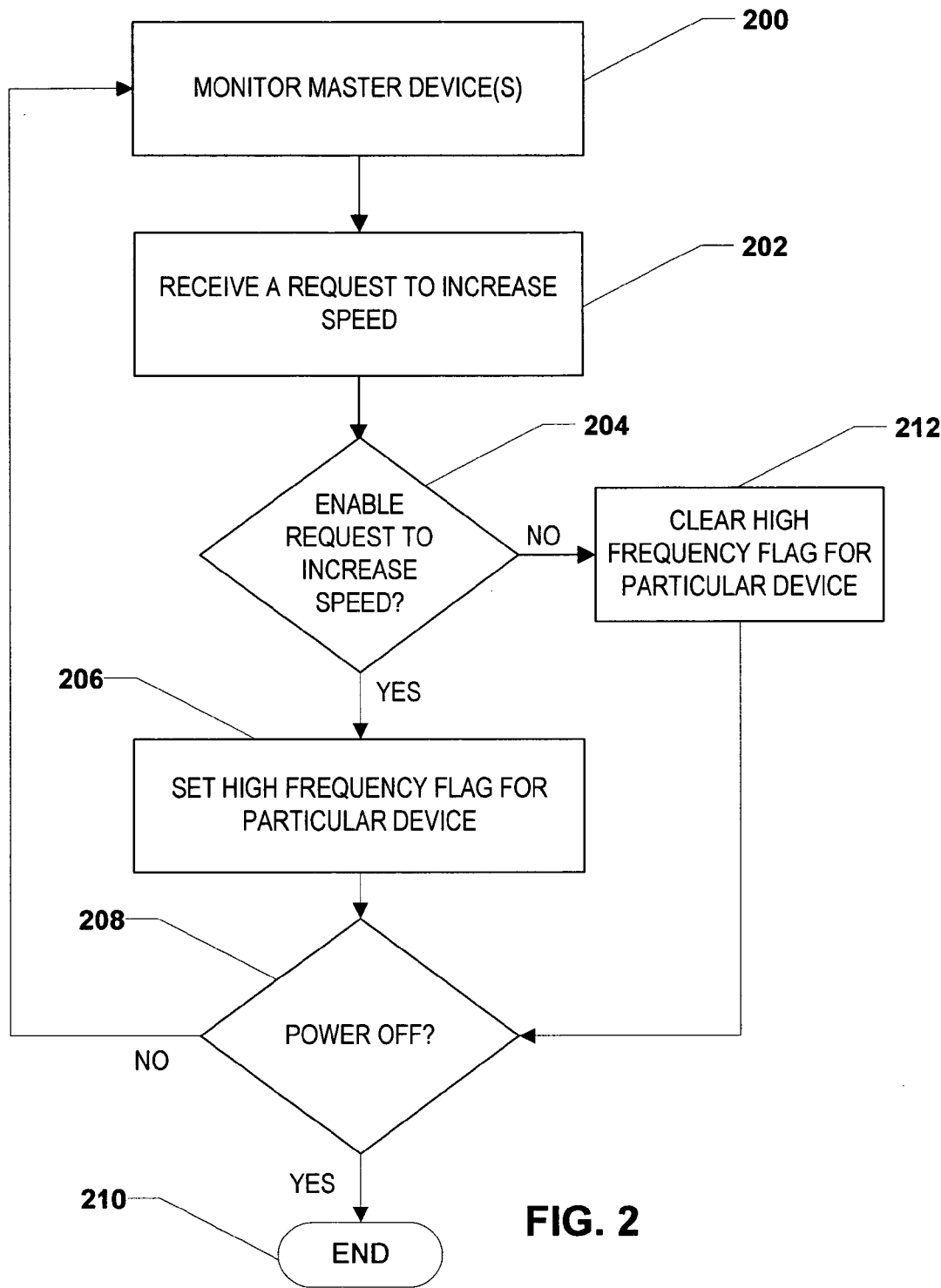
FIG. 2 is a flow chart illustrating a method of setting bus speed control flags within an electronic system is shown.

FIG. 2 is a flow chart illustrating a method of setting bus speed control flags within an electronic system is shown and commences at block 200. In a particular embodiment, the electronic system is the system 100 illustrated in FIG. 1. Commencing at block 200, a controller, e.g., an arbiter or clock controller, monitors one or more master devices. At block 202, the controller receives a request to increase bus speed from a master device.

Moving to decision step 204, the controller determines whether to enable the request to increase the bus speed. If so, the method proceeds to block 206 and the controller sets a high frequency flag for the particular device. Next, at decision step 208, the controller determines whether the power to the system is turned off. If so, the method ends at state 210. On the other hand, if the power to the system remains on, the method returns to block 200 and continues as described herein.

Returning to decision step 204, if the controller determines not to enable the request to increase the bus speed, the method moves to block 212 and the controller clears the high frequency flag for the particular device. The method then proceeds to decision step 208 and continues as described herein.

Figure 3:
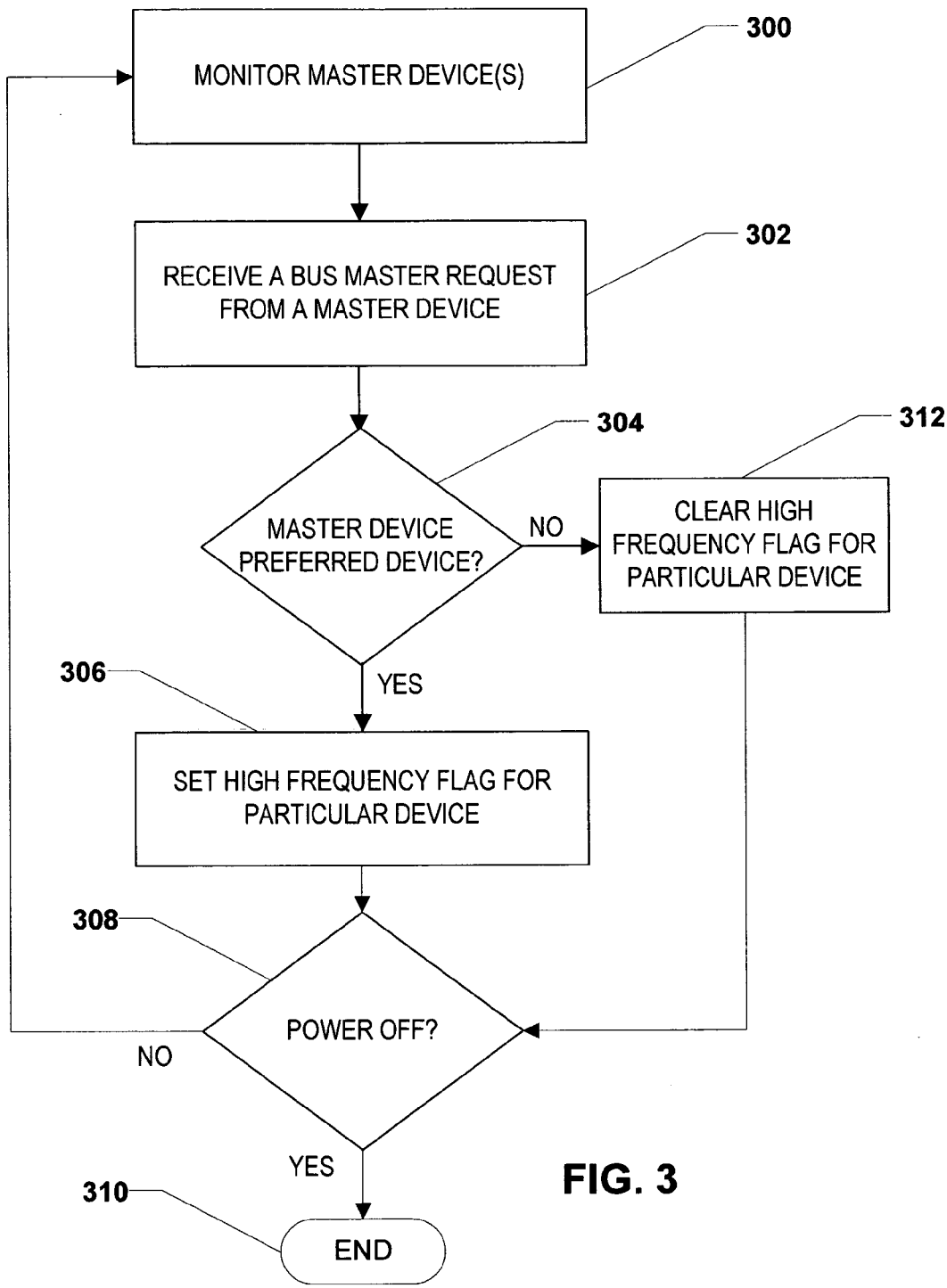
FIG. 3 is a flow chart illustrating an alternative embodiment of a method of setting bus speed control flags within an electronic system is shown.

Referring to FIG. 3, a flow chart illustrating an alternative method of setting bus speed control flags within an electronic system is shown. Beginning at block 300, a controller, e.g., an arbiter or a clock controller, monitors one or more master devices. At block 302, the controller receives a bus master request from a master device. Moving to decision step 304, the controller determines whether the master device is a preferred device. In a particular embodiment, the arbiter may make this determination by comparing the master device to a predefined list of preferred devices.

At decision step 304, when the controller determines that the master device that sent the bus master request is a preferred device, the method proceeds to step 306 and the controller sets a high frequency flag for the particular master device. Next, at decision step 308, the controller determines whether the power to the system is turned off. If so, the method ends at state 310. On the other hand, if the power to the system remains on, the method returns to block 300 and continues as described herein.

Returning to decision step 304, if the controller determines that the master device is not a preferred device, the method proceeds to block 312 and the controller clears the high frequency flag for the particular master device. The method then proceeds to decision step 308 and continues as described herein.

Figure 4:
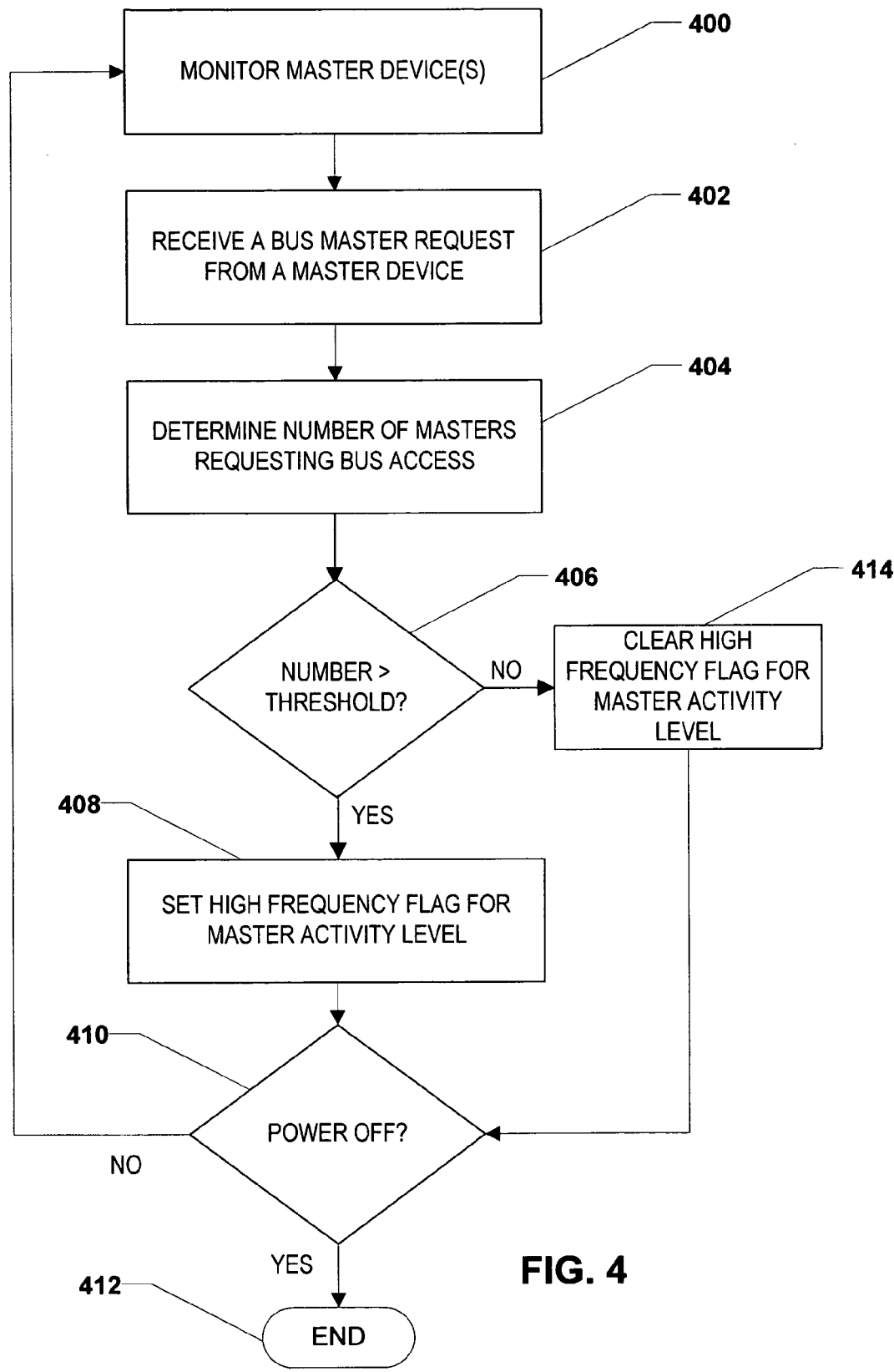
FIG. 4 is a flow chart illustrating an alternative embodiment of a method of setting bus speed control flags within an electronic system is shown.

FIG. 4 is a flow chart illustrating another alternative embodiment of a method of setting bus speed control flags within an electronic system is shown. Starting at step 400, a controller, e.g., an arbiter or a clock controller, monitors each one of a plurality of master devices coupled to a bus. Next, at step 402, the controller receives a bus master request from a master device. Moving to step 404, the controller determines the number of master devices requesting bus access.

At decision step 406, the controller determines whether the number of master devices requesting bus access is greater than a threshold. If so, the method proceeds to block 408 and the controller sets a high frequency flag for master activity level. Next, at decision step 410, the controller determines whether the power to the system is turned off. If so, the method ends at state 412. On the other hand, if the power to the system remains on, the method returns to block 400 and continues as described herein.

Returning to decision step 406, if the controller determines that the number of master devices requesting bus access is not greater than the threshold, the method continues to block 414. At block 414, the controller clears the high frequency flag for master activity level. The method then proceeds to decision step 410 and continues as described herein.

Figure 5:
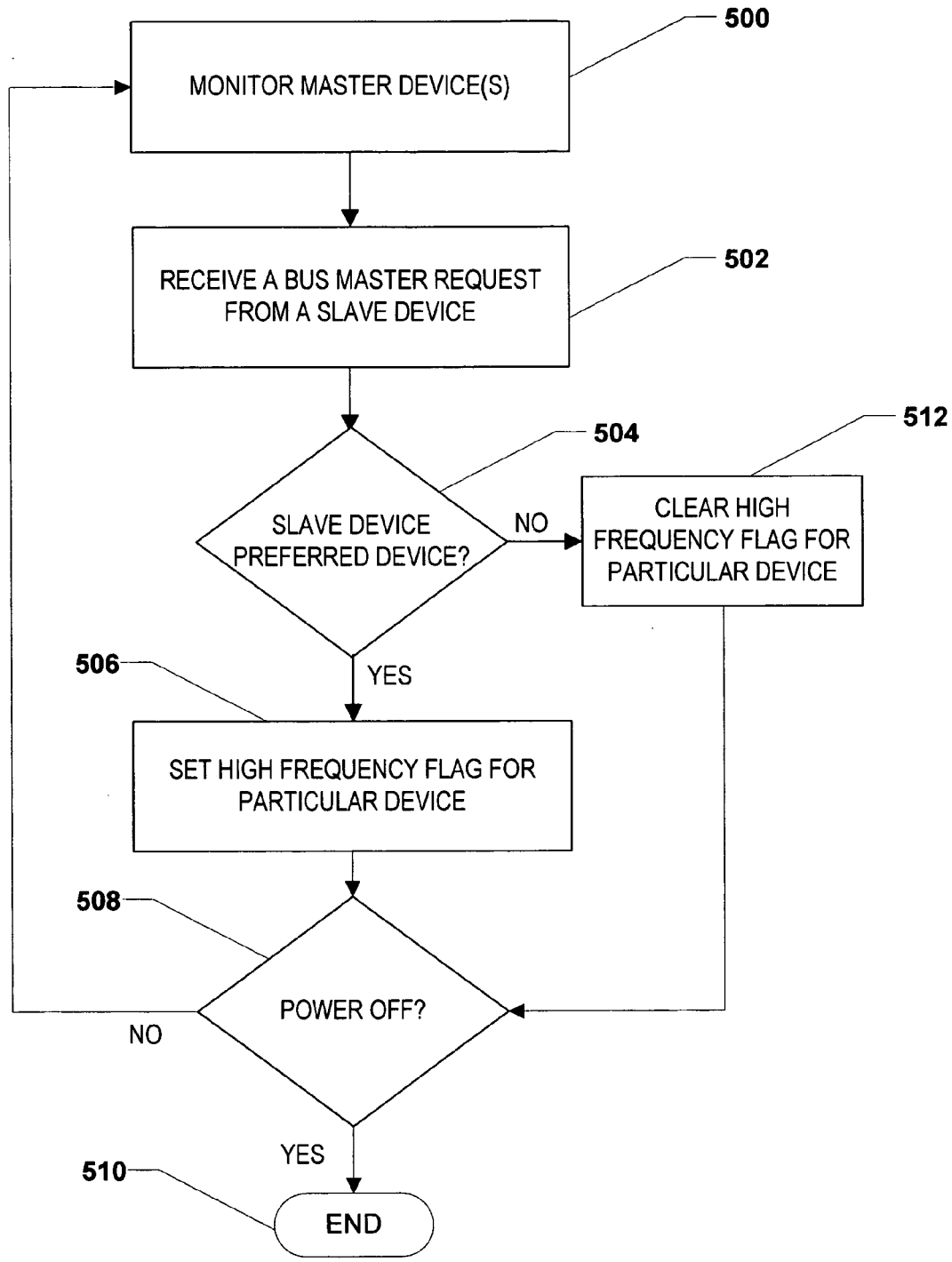
FIG. 5 is a flow chart illustrating yet another alternative embodiment of a method of setting bus speed control flags within an electronic system is shown.

Referring to FIG. 5, a flow chart illustrating yet another alternative of a method of setting bus speed control flags within an electronic system is shown. Beginning at block 500, a controller monitors one or more slave devices. At block 502, the controller receives a bus master request from a slave device. Moving to decision step 504, the controller determines whether the slave device is a preferred device. In a particular embodiment, the arbiter may make this determination by comparing the slave device to a predefined list of preferred devices.

At decision step 504, when the controller determines that the slave device that sent the bus master request is a preferred device, the method proceeds to step 506 and the controller sets a high frequency flag for the particular slave device. Next, at decision step 508, the controller determines whether the power to the system is turned off. If so, the method ends at state 510. On the other hand, if the power to the system remains on, the method returns to block 500 and continues as described herein.

Returning to decision step 504, if the controller determines that the slave device is not a preferred device, the method proceeds to block 512 and the controller clears the high frequency flag for the particular slave device. The method then proceeds to decision step 508 and continues as described herein.

Figure 6:
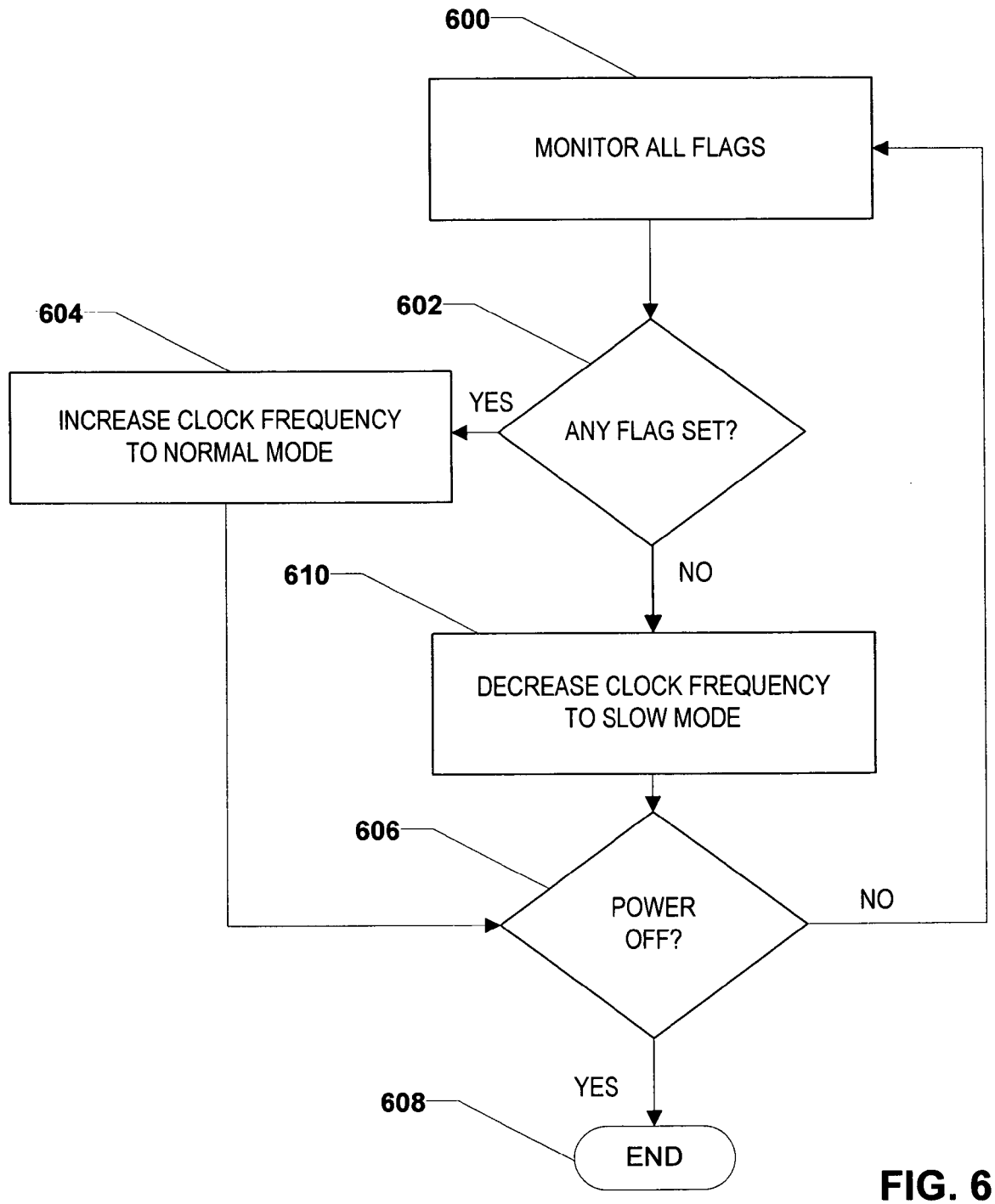
FIG. 6 is a flow chart illustrating a method of monitoring one or more speed control flags within an electronic system.

Referring to FIG. 6, a method of monitoring one or more speed control flags within an electronic system is shown and commences at block 600. At block 600, a controller, e.g., an arbiter or clock controller, monitors all speed control flags within the electronic system. Moving to decision step 602, the controller determines whether any flag is set. If so, the method proceeds to block 604 and the controller increases the clock frequency to a normal mode. Thereafter, the method proceeds to decision step 606 and the controller determines whether the power to the system is turned off. If so, the method ends at state 608. On the other hand, if the power to the system is not turned off, the method returns to block 600 and continues as described herein.

Returning to decision step 602, when the controller determines that the speed control flags are not set, the method proceeds to block 610 and the controller decreases the clock frequency to a slow mode. The method then continues to decision step 606 and continues as described herein.

In each of the methods described herein, various steps described above may be added, omitted, combined, altered, or performed in different orders.

For purposes of this disclosure, the disclosed system may include any instrumentality or aggregate of instrumentalities operable to perform functions such as transmit, receive, compute, classify, process, retrieve, originate, switch, store, display, manifest, detect, record, reproduce, handle, or utilize any form of information, intelligence, or data for consumer, business, scientific, control, or other purposes. For example, the system 100 may be implemented as one or more integrated circuits, a printed circuit board, a processor, or any other suitable device and may vary in size, shape, performance, functionality, and price. It should be understood that the term "computer system" or "program" is intended to encompass any device having a logic circuit that executes instructions from a memory medium.

Although illustrative embodiments have been shown and described, a wide range of modification, change and substitution is contemplated in the foregoing disclosure and in some instances, certain features of the embodiments may be employed without a corresponding use of other features. For example, while certain aspects of the present disclosure have been described in the context of the system 100 having one or more devices, those of ordinary skill in the art will appreciate that the processes disclosed are capable of being implemented using discrete components and/or SoC. As an additional example, it is contemplated that additional clocks used within the system may be similarly controlled to gain additional savings in power consumption.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   monitoring a plurality of master devices coupled to a bus;
   receiving a request, from a first master device of the plurality of master devices, to change a clock frequency of a high-speed clock, the request sent from the first master device in response to a predefined change in performance of the first master device, wherein the predefined change in performance is due to loading of the first master device as measured within a predefined time interval; and
   in response to receiving the request from the first master device:
      providing the clock frequency of the high-speed clock as an output to control a clock frequency of a second master device coupled to the bus; and
      providing the clock frequency of the high-speed clock as an output to control a clock frequency of the bus.

2. The method of claim 1, wherein the first master device performs a clock-frequency evaluation prior to generating the request.

3. The method of claim 2, wherein the clock-frequency evaluation results in setting a high-speed clock flag.

4. The method of claim 1, wherein the predefined time interval is from one microsecond to several milliseconds.

5. The method of claim 1, wherein the loading of the first master device includes a level of audio processing.

6. The method of claim 5, wherein the audio processing comprises audio processing of a Moving Picture Experts Group Phase 1 (MPEG-1) Audio Layer-3 (MP3) player.

7. The method of claim 1, wherein controlling the clock frequency of the bus comprises adjusting the clock frequency of the bus.

8. The method of claim 1, wherein the request to change the clock frequency of the high-speed clock comprises a request to increase the clock frequency of the high-speed clock.

9. The method of claim 1, wherein the predefined change in performance comprises a variation in output of the first master device.

10. The method of claim 9, wherein the output of the first master device comprises a signal output.

11. The method of claim 10, wherein the signal output comprises a signal output of a Moving Picture Experts Group Phase 1 (MPEG-1) Audio Layer-3 (MP3) player.

12. The method of claim 1, wherein the predefined change in performance comprises a change in power consumed by the first master device.

13. The method of claim 7, wherein adjusting the clock frequency of the bus comprises adjusting the variable clock frequency of the bus from a non-zero value to another non-zero value without stopping a clock.

14. A system comprising:
   a bus capable of operation at a variable clock frequency;
   a first master device coupled to the bus, the first master device configured to provide a request to change a clock frequency of a high-speed clock in response to a predefined change in performance of the first master device, wherein the predefined change in performance is due to loading of the first master device as measured within a predefined time interval; and
   a programmable clock controller having an embedded computer program therein, the computer program including instructions to:
      receive the request provided by the first master device;
      provide the clock frequency of the high-speed clock as an output to control a clock frequency of a second master device coupled to the bus in response to receiving the request provided by the first master device; and provide the clock frequency of the high-speed clock as an output to control the variable clock frequency of the bus in response to receiving the request provided by the first master device.

15. The system of claim 14, wherein the computer program further includes instructions to adjust the variable clock frequency of the bus to a predetermined frequency when no request is received from the first master device.

16. The system of claim 14, wherein the first master device performs a clock-frequency evaluation prior to generating the request, and wherein the loading of the first master device includes a level of audio processing of a Moving Picture Experts Group Phase 1 (MPEG-1) Audio Layer-3 (MP3) player.

17. The system of claim 14, wherein the instructions to provide the clock frequency of the high-speed clock as an output to control the variable clock frequency of the bus include instructions to adjust the clock frequency of the bus.

18. A system comprising:
a bus capable of operation at a variable clock frequency;
a first master device coupled to the bus;
an arbiter coupled to the bus and coupled to the first master device, the arbiter configured to control flow of data on the bus; and
a clock controller coupled to the arbiter and coupled to the first master device, the clock controller configured to output a clock frequency of a high-speed clock to control the variable clock frequency of the bus and to control a clock frequency of a second master device coupled to the bus, the clock controller configured to receive a request to change the clock frequency of the high-speed clock from the first master device, the request sent from the first master device in response to a predefined change in performance of the first master device, wherein the clock controller is configured to adjust the variable clock frequency of the bus in response to receiving the request from the first master device, and wherein the predefined change in the performance is due to loading of the first master device as measured within a predefined time interval.

19. The system of claim 18, wherein the first master device performs a clock-frequency evaluation prior to generating the request and wherein the change in performance comprises a change in power consumed by the first master device.

20. The system of claim 18, wherein the clock controller automatically adjusts the variable clock frequency of the bus to a predetermined frequency when no requests are received from the first master device.

21. The system of claim 18, wherein adjusting the variable clock frequency of the bus comprises decreasing the clock frequency of the bus.

22. The system of claim 18, wherein adjusting the variable clock frequency of the bus comprises selecting the variable clock frequency to be a frequency divisible by a factor of 1, 2, 4, 8, or 16.

23. The system of claim 18, wherein the predefined change in the performance of the first master device comprises a variation in a signal output of a Moving Picture Experts Group Phase 1 (MPEG-1) Audio Layer-3 (MP3) player.

24. The system of claim 18, wherein the predefined change in the performance of the first master device comprises a variation in load of the first master device.

25. The system of claim 24, wherein the load of the first master device includes a level of audio processing of a Moving Picture Experts Group Phase 1 (MPEG 1) Audio Layer-3 (MP3) player.

26. The system of claim 18, wherein the predefined change in the performance of the first master device comprises a change in power consumed by the first master device and wherein the request to change the variable clock frequency of the bus comprises a request to increase the variable clock frequency of the bus.

27. The system of claim 18, wherein adjusting the variable clock frequency of the bus comprises adjusting the variable clock frequency of the bus from a non-zero value to another non-zero value without stopping a clock.

\* \* \* \* \*